United States Patent
Iizumi et al.

(10) Patent No.: US 6,891,638 B1
(45) Date of Patent: May 10, 2005

(54) IMAGE PROCESSING APPARATUS, IMAGE PROCESSING METHOD, AND STORAGE MEDIUM

(75) Inventors: Tomoo Iizumi, Yokohama (JP); Masahiko Murata, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,192

(22) Filed: Dec. 23, 1999

(30) Foreign Application Priority Data

| Jan. 5, 1999 | (JP) | ............................................. | 11-000683 |
| Dec. 16, 1999 | (JP) | ............................................. | 11-358026 |

(51) Int. Cl.⁷ ............................ G06K 15/00; H04N 1/46
(52) U.S. Cl. ......................... 358/1.9; 358/515; 358/517; 382/162; 382/167
(58) Field of Search ................................ 382/167, 162, 382/285; 358/1.9, 3.23, 501, 504, 515, 517, 518, 522, 530, 2.1, 500, 520

(56) References Cited

U.S. PATENT DOCUMENTS

| 5,748,343 A | 5/1998 | Ikeda .......................... 358/501 |
| 6,268,930 B1 * | 7/2001 | Ohta ............................ 358/1.9 |
| 6,323,958 B1 | 11/2001 | Shimizu ....................... 358/1.9 |
| 6,323,969 B1 * | 11/2001 | Shimizu ....................... 358/523 |
| 6,539,108 B1 * | 3/2003 | Kobayashi .................... 382/162 |
| 6,546,132 B1 * | 4/2003 | Bhattacharjya .............. 382/162 |
| 6,591,009 B1 * | 7/2003 | Usami ......................... 382/165 |

FOREIGN PATENT DOCUMENTS

| JP | 06-320802 A | 11/1994 | .............. B41J/5/30 |
| JP | 07-135575 A | 5/1995 | ............ H04N/1/60 |
| JP | 08-139953 A | 5/1996 | ............ H01N/1/60 |
| JP | 08-317236 A | 11/1996 | ............ H04N/1/60 |
| JP | 09-018732 A | 1/1997 | ............ H04N/1/60 |

* cited by examiner

Primary Examiner—Jerome Grant, II
(74) Attorney, Agent, or Firm—Fitzpatrick, Cella, Harper & Scinto

(57) ABSTRACT

An image processing apparatus which is set to receive data in the RGB format cannot directly receive image data in the YMCK format although a print process is finally done in the YMCK format.

In this embodiment, when RGB data is input from a host computer, renderers respectively render the R, G, and B data, the rendered R, G, and B data are converted into YMCK data by a color space converter, and the YMCK data is output to an engine. On the other hand, when YMCK data is input, renderers respectively render Y, M, C, and K image data, and directly output them to the engine.

15 Claims, 8 Drawing Sheets

FIG. 4A
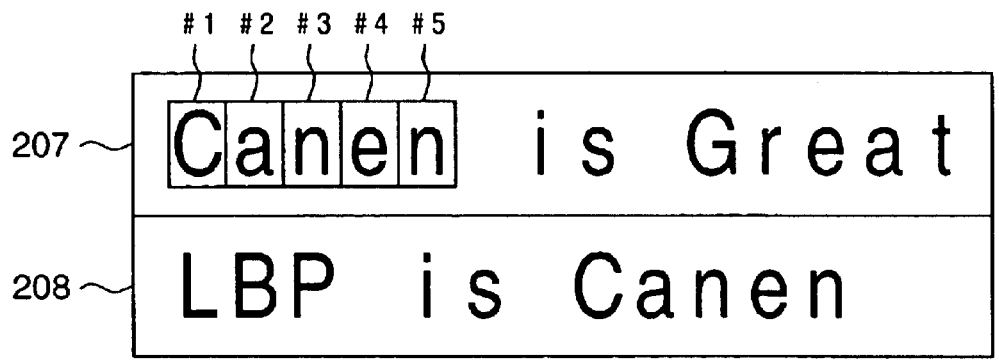
FIG. 4B
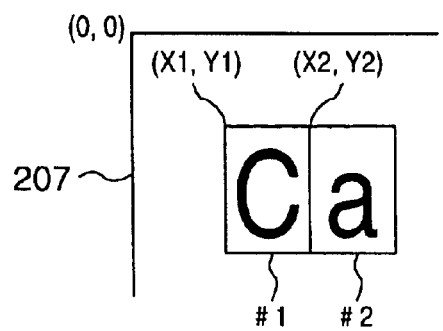
FIG. 4C
FIG. 4D

IMAGE PROCESSING APPARATUS, IMAGE PROCESSING METHOD, AND STORAGE MEDIUM

BACKGROUND OF THE INVENTION

The present invention relates to an image processing apparatus, image processing method, and storage medium.

Conventionally, most of image processing apparatuses that print multi-color images form an image on a recording medium using a plurality of colors of recording agents such as yellow (Y), magenta (M), cyan (C), black (K), and the like.

In a system in which such image processing apparatus and a host computer are connected, image data is normally generated on the host computer side. Hence, it is often the case that image data consisting of red (R), green (G), and blue (B) color components that can be displayed on a CRT or the like is generated, and image data in the RGB format (to be referred to as RGB data hereinafter) is transferred to the image processing apparatus side.

The image processing apparatus prints an image by the following method on the basis of the transferred RGB data.

For example, after RGB data for one page is rendered, the rendered data is batch-converted into a YMCK format. Image data in the YMCK format (to be referred to as YMCK data hereinafter) for one page undergoes processes such as compression and the like as needed, and is then stored in a memory or the like. In response to a print start command, the YMCK data is transferred to an engine unit to print an image on a recording medium.

Alternatively, RGB data transferred from the host computer is converted into YMCK data, and print data for one page is generated in units of Y, M, C, and K colors, thus printing an image.

In a conventional image processing apparatus, a method (banding) for dividing print contents for one page into a plurality of bands, and parallelly executing actual print operation on a recording medium and a print data generation process in units of bands so as to reduce the image memory size required in the print process is known.

The conventional image processing apparatus assumes that the format of input image data is either the RGB or YMCK format. Hence, an image processing apparatus which is set to receive data in the RGB format cannot directly receive image data in the YMCK format although it finally prints data in the YMCK format.

SUMMARY OF THE INVENTION

It is an object of the present invention to provide an image processing apparatus, image processing method, and storage medium, which can solve the aforementioned problem.

It is another object of the present invention to provide an image processing apparatus, image processing method, and storage medium, which can appropriately form an image independently of the format of input image data.

To achieve the above objects, one preferred embodiment of the present invention provides an image processing apparatus comprising rendering means for rendering data in a first color space and data in a second color space, and a plurality of image forming means for forming images in units of colors of the rendered image data.

It is still another object of the present invention to provide an image processing apparatus, image processing method, and storage medium, which have novel functions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A to 4D are views for explaining the contents of the display list;

DESCRIPTION OF THE PREFERRED EMBODIMENTS

Preferred embodiments according to the present invention will be described in detail hereinafter with reference to the accompanying drawings.

First Embodiment

Overall Arrangement

Figure 1:
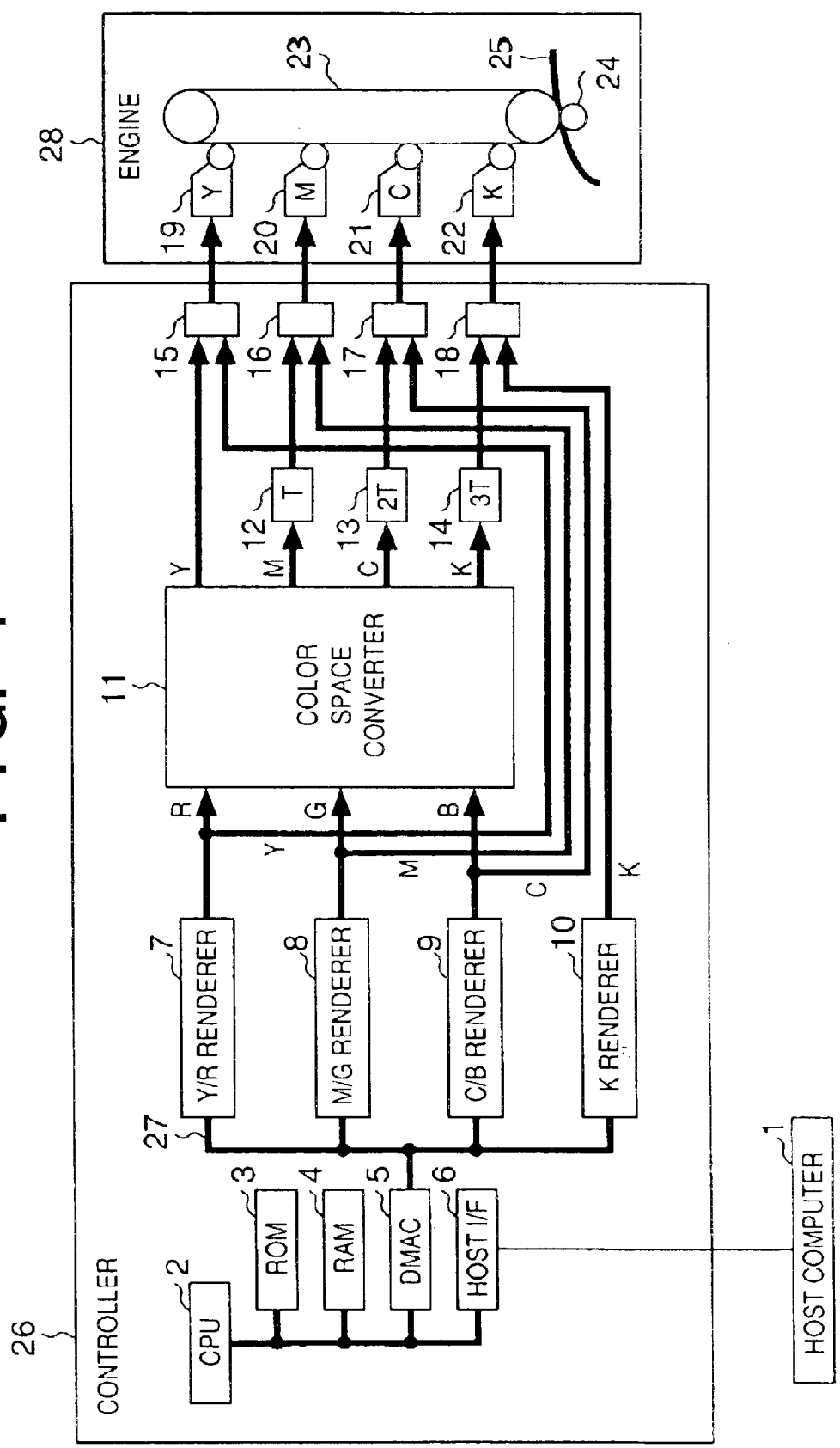
FIG. 1 is a block diagram showing the arrangement of an image processing apparatus according to the first embodiment of the present invention.

FIG. 1 is a block diagram showing the arrangement of an image processing apparatus of this embodiment. Referring to FIG. 1, reference numeral 26 denotes a controller; and 28, an engine. The controller 26 is connected to a host computer 1 as an external apparatus.

In the controller 26, reference numeral 2 denotes a CPU for systematically controlling the entire image processing apparatus; 3, a ROM for holding programs and the like executed by the CPU 2; 4, a RAM which serves as a work area of the CPU 2, and holds a display list (to be described later); 5, a DMA controller for reading out the display list from the RAM 4, and transferring it to renderers via a bus 27; and 6, an interface for controlling data transfer with the host computer 1.

Reference numerals 7, 8, 9, and 10 denote renderers for respectively rendering R and Y, G and M, B and C, and K data on the basis of the display list (to be respectively referred to as an R renderer 7, G renderer 8, B renderer 9, and K renderer 10 hereinafter). Reference numeral 11 denotes a color space converter for converting RGB data for one band, output from the R, G, and B renderers 7, 8, and 9, into data in a YMCK color space in correspondence with a print data format in the engine 28. Reference numerals 12, 13, and 14 denote delay circuits for delaying YMCK data converted by the color space converter 11 in correspondence with print timings. The delay circuits 12, 13, and 14 respectively receive M, C, and K data and delay them by times T, 2T, and 3T. That is, Y, M, C, and K data are respectively delayed to have a time difference T. Reference numeral 15 to 18 denote selectors which select the outputs from the delay circuits 12 to 14 and renderers 7 to 10 under the control of the CPU 2, and output selected outputs to the engine 28.

In the engine 28, reference numerals 19 to 22 denote developers for developing corresponding color image data using recording agents; 23, a transfer belt for superposing images developed in units of colors to complete a multi-color image for one page; and 24, a transfer roller for transferring the multi-color image formed on the transfer belt 23 onto a recording medium 25.

Renderer Arrangement

Figure 2:
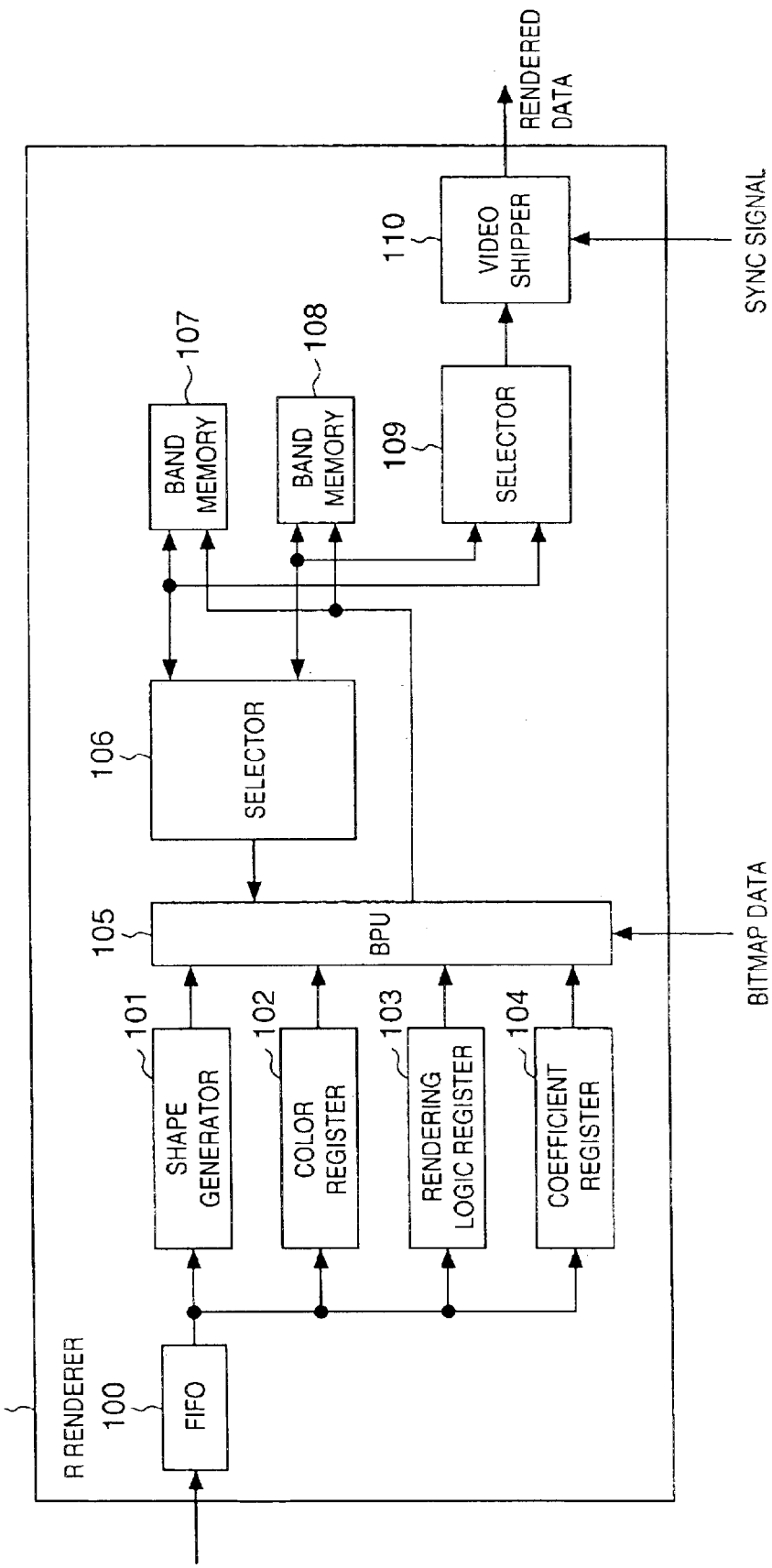
FIG. 2 is a block diagram showing the detailed arrangement of a renderer.

FIG. 2 is a block diagram showing the detailed arrangement of the R renderer. Note that since the renderers 7 to 10 have the same arrangement, only the R renderer 7 will be explained below.

Referring to FIG. 2, reference numeral 100 denotes a FIFO; 101, a shape generator for generating shape data that indicates the outer shape of an image; and 102, a color register. By computing the AND of shape data generated by the shape generator 101 and a color designated by the color register 102, new image data to be written (to be referred to as write data hereinafter) is generated. Reference numeral 103 denotes a register for holding a rendering logic of bitmap data held in advance in the apparatus, and write data; and 104, a coefficient register for holding a mixing ratio of the bitmap data and write data. Note that the storage location of the bitmap data is not particularly limited, and the bitmap data may be stored in, e.g., the RAM 4.

The contents of these registers are set based on the display list input from the host computer or made by CPU 2 in accordance with host computer commands.

Reference numeral 105 denotes a BPU (bit processing unit) for making a logic operation of the bitmap data and write data in practice. Write data is generated by ANDing shape data generated by the shape generator 101 and a color designated by the color register, and then undergoes a logic operation with bitmap data in accordance with parameters held in the rendering logic register 103 and coefficient register 104. The operation result is held in the BPU 105 as new bitmap data.

Reference numerals 106 and 109 denote selectors which control to alternately use one of two band memories 107 and 108, which hold bitmap data in units of bands, as a rendering data generation buffer, and the other as an output buffer for outputting already complete bitmap data for one band. That is, when the band memory 107 generates rendering data, the already complete bitmap data in the band memory 108 is output as rendering data. After the rendering data is output from the band memory 108, rendering data completed by the band memory 107 is output. At this time, in the band memory 108, new rendering data is generated. By repeating the above processes, rendering data can be continuously output.

Reference numeral 110 denotes a video shipper for controlling generation of addresses, bus width conversion, and the like of the band memories 107 and 108 as output buffers so as to output bitmap data in accordance with the rendering timings of respective color images.

Details of Display List

Image data in this embodiment is generated by the host computer 1, and is input to the host interface 6 in a predetermined format. The image data in the predetermined format is interpreted and mapped into a display list by the CPU 2, and the display list is stored in the RAM 4. The display list in this embodiment will be described in detail below.

Figure 3:
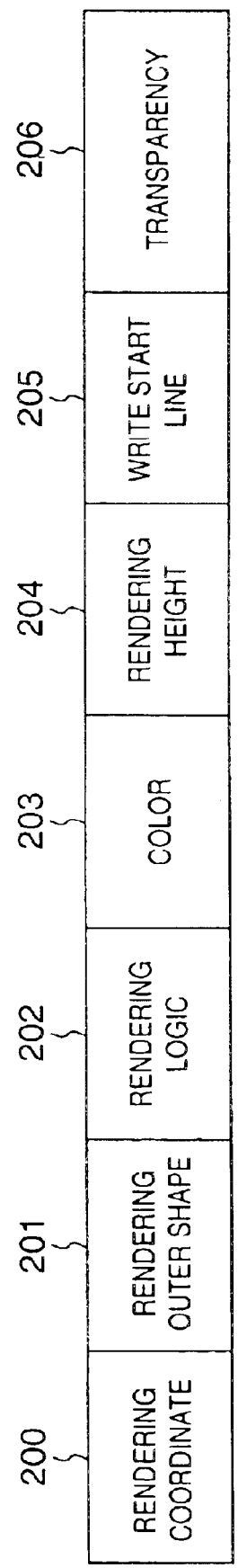
FIG. 3 shows the format of a display list.

FIG. 3 shows an example of the data format of the display list, and FIGS. 4A to 4D show an example of the contents of the display list corresponding to actual image data.

One element of the display list is generated for each character unit in image data. In the example of the format of the display list shown in FIG. 3, reference numeral 200 denotes a rendering coordinate position indicating a rendering position of an image unit (character or the like) to be rendered to have a start point as a reference position of each band as an origin; 201, a number indicating the outer shape of an image to be rendered; and 202, a rendering logic which indicates logic operations to be applied to bitmap data and image data to be rendered. As the rendering logic 202, "OR" indicating logic sum operation, "EXOR" indicating reversal of an image, and the like are set in accordance with a rendering instruction from the host computer 1. Reference numeral 203 denotes color data indicating color information to be assigned to rendering shape data. As the color data 203, color information is designated in the RGB or YMCK format.

Reference numerals 204 and 205 respectively denote rendering height information and write start line information, which set the write start line and the number of lines to be rendered of the outer shape designated by the rendering outer shape 201. For example, when a character which extends over two bands is to be rendered, in the upper band, the write start line 205 indicates the start line of the outer shape of that character and the rendering height 204 indicates a height from that start line to the end line of the upper band. On the other hand, in the lower band, the write start line 205 indicates the start line of that band, and the rendering height 204 indicates the height from that start line to the end line of the image outer shape.

Reference numeral 206 denotes transparency, i.e., a mixing ratio, required upon mixing bitmap and image data based on the logic operations designated by the rendering logic 202.

Examples of the individual elements of the above-mentioned display list will be explained below using FIGS. 4A to 4D.

A display list for a character image shown in FIG. 4A will be taken as an example. A character image shown in FIG. 4A consists of two bands 207 and 208. Elements of the display list are generated in units of characters indicated by element numbers #1 to #5 in, e.g., the band 207, and FIG. 4B shows that example.

For example, assume that characters indicated by element numbers #1 and #2 in FIG. 4A have coordinate positions in the band 207, as shown in FIG. 4C. In this case, "(X1, Y1)" is set for the rendering coordinate 200 as one element of element number #1, as shown in FIG. 4B. As for the rendering outer shape 201, "F1" indicating character "C" is set on the basis of an outer shape list shown in, e.g., FIG. 4D. As for element numbers #3 and #5, since corresponding characters have an identical outer shape "n", "F3" is set based on FIG. 4D.

As for the rendering logic 202, "OR" of write data (Dist) and bitmap data (Obj) is set. Also, the color data 203 is set in units of color components of the RGB format. In FIG. 4B, the setting contents of the rendering height 204 and write start line 205 are omitted, and finally, the transparency is set at 100%.

Note that the individual items that form the display list shown in FIG. 3 are held in the corresponding registers in each renderer as follows. That is, the rendering coordinate 200, rendering outer shape 201, rendering height 204, and write start line 205 are held in the shape generator 101, the color data 203 in the color register 102, the rendering logic 202 in the rendering logic register 103, and the transparency 206 in the coefficient register 104.

Note that print data for one page is divided in units of bands, and is converted into a display list.

Banding Determination Process

In this embodiment, a banding process is done under the control of the CPU 2 so as to reduce the image memory size required in the print process. More specifically, print contents for one page are divided into a plurality of bands, and a print process onto a banding recording medium and a rendering process of print data are parallelly executed in units of bands.

Figure 5:
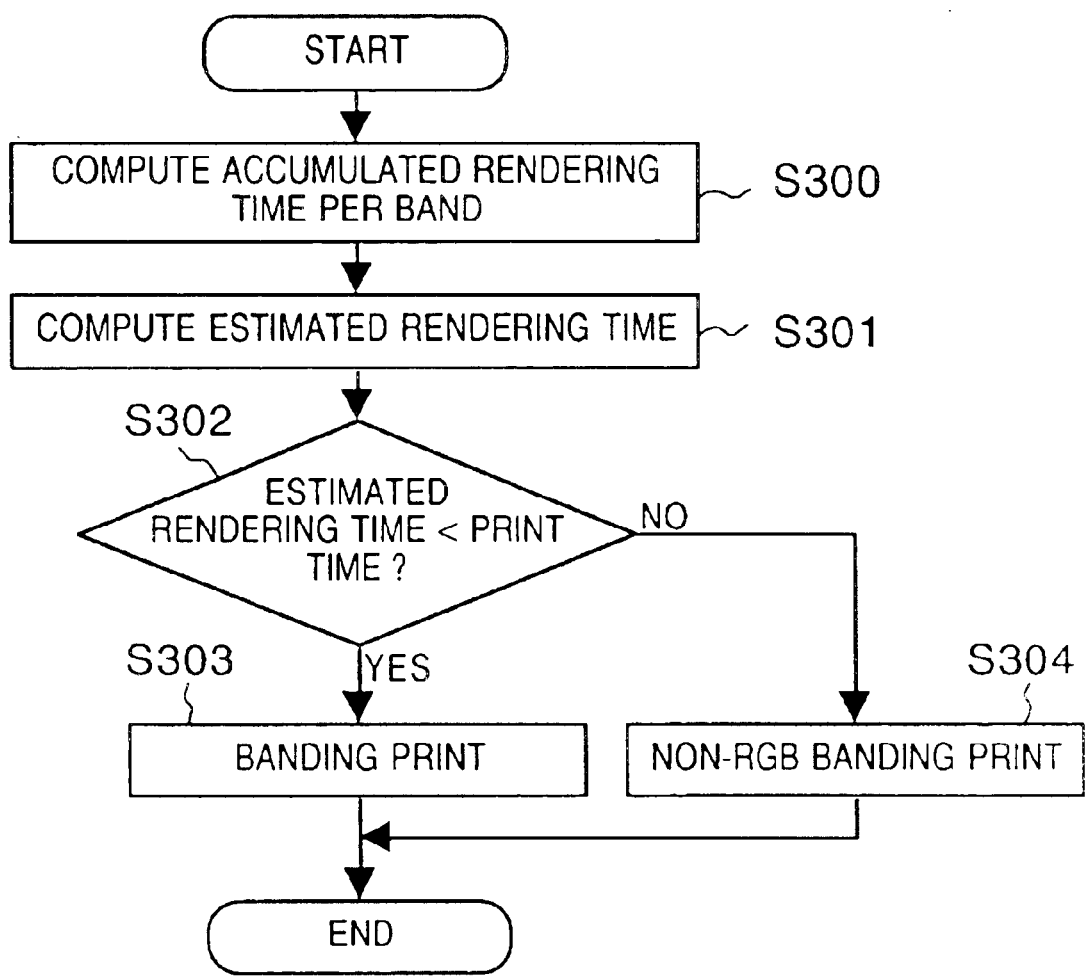
FIG. 5 is a flow chart showing a banding determination process.

As described above, upon completion of a display list for one page, the CPU 2 determines if a print process can be done in units of bands, and prints based on the determination result. FIG. 5 is a flow chart showing the details of this determination process.

In step S300, a time required for rendering data to be rendered is computed in units of bands with reference to the contents of the display list, thus obtaining band rendering times. In this case, a margin level (coefficient) of each band rendering time with respect to a band print time, which is set in advance in the ROM 3 or the like, is loaded.

The margin level will be briefly explained below.

Each renderer accesses the required display list via the common bus 27. Hence, when two or more renderers simultaneously access the display list, more than one of these renderers fail to obtain the display list at the request timing of the display list. As a result, even when the band memory is accessed to start a print process in units of bands, band rendering may not be complete yet.

When a given band includes a small number of objects (e.g., a small number of characters shown in FIG. 4A) and, hence, includes a small number of rendered data, and the next band includes a large number of data to be rendered, rendering of the next band is not complete even after the rendered data of the given band with a small number of rendered data have been output to the engine 28. In this case, data access for outputting data from that band to the engine 28 must be waited.

To absorb such inadvertent delay of rendering, a margin is given to the band rendering time with respect to the band print time. Data indicating this margin is the margin level.

In step S301, the sum of the band rendering times is multiplied by the coefficient to compute an expected rendering time per band (expected band rendering time).

It is then checked in step S302 if the computed expected band rendering time falls within a time required for printing one band (to be referred to as a band print time hereinafter). That is, if the expected band rendering time falls within the band print time, it is determined that a print process by means of banding is possible, and a banding print process in step S303 is executed.

On the other hand, if the expected band rendering time is longer than the band print time, it is determined that a print process of one band parallel to a rendering process of the next band, i.e., the print process by means of banding cannot be done. The flow then advances to step S304 to execute a non-banding print process. For example, the print process is canceled, and a message indicating that the banding print process is impossible is sent to the host computer 1 to inform the operator of the host computer of that message, or such message is displayed for the operator using a console (not shown) of the image processing apparatus. Since it is preferable if the image processing apparatus proceeds with the print process even if the format is changed, a process for normally printing an image (a process for reducing the data size to be processed) such as a change of print contents themselves (e.g., if print data is multi-valued image data, it is converted into data having a smaller number of gray levels), or the like may be made.

Even when a banding print process in the RGB format is impossible, a banding print process in the YMCK format may be possible in some cases, as will be described later. Hence, upon sending a message indicating that the banding print process is impossible to the host computer 1 in step S304, it is effective to inform the operator that it may be possible to print by transferring image data in the YMCK format.

That is, if it is determined in step S302 that the banding print process in the RGB format is possible, a banding print process in the RGB format is executed in step S303; if it is determined that the banding print process in the RGB format is impossible, a banding print process in the YMCK format can be executed in step S304.

Features of RGB banding and YMCK banding will be explained below.

Upon comparing RGB banding and YMCK banding, Y, M, C, and K signals must be generated in RGB banding using R, G, and B component signals after banding unlike rendering based on YMCK.

For this reason, R, G, and B planes must be simultaneously generated and stored, and the bus 27 must have certain line capacity to obtain the display list. When a high-resolution image is to be processed in the RGB format, the bus 27 must have a larger capacity, and delay circuits (inter-frame delay buffers) with a large capacity are also required.

On the other hand, problems with YMCK banding are that four color components are always required, and color reproducibility of a portion where objects overlap suffers compared to rendering based on RGB. However, even when data sizes to be processed vary depending on banding positions, the data generation timings of Y, M, C, and K planes can be shifted by time T (to be described later) in the image forming sequence of the engine 28. As a result, the data volumes that pass through the bus 27 can be distributed.

Figure 6:
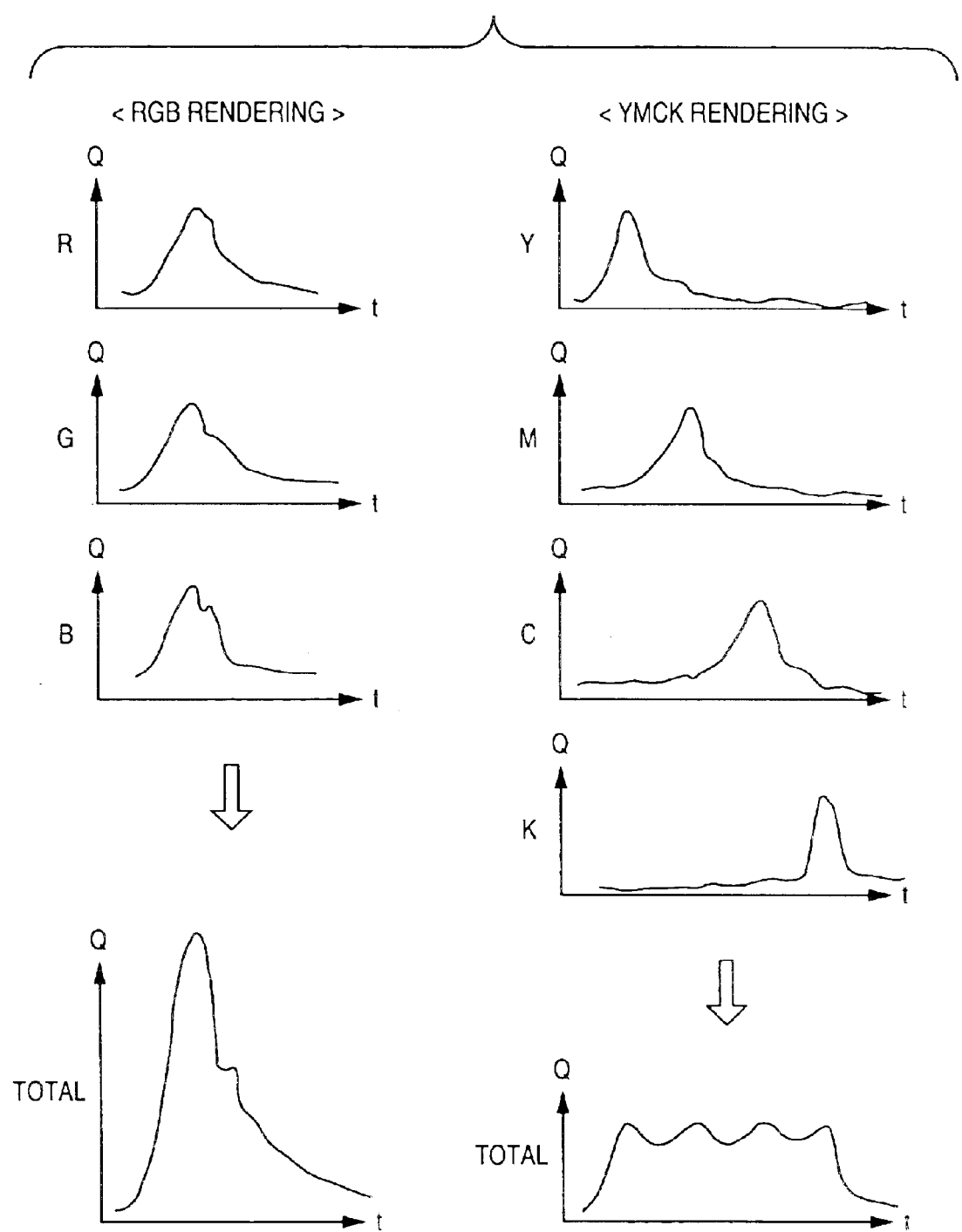
FIG. 6 shows graphs of the bus load and rendering time in RGB banding and YMCK banding.

FIG. 6 shows graphs showing the relationships between the bus load (data size Q) and rendering time (t) in RGB and YMCK rendering processes. In RGB rendering, as R, G, and B data are required at the same timing, data is transferred in large quantity onto the bus 27. By contrast, in case of YMCK banding, as individual color data pass through the bus 27 at different timings, the data size can be reduced compared to RGB data even when the bus 27 has heavy traffic. This is why YMCK banding may be possible even when RGB banding is impossible.

In YMCK rendering shown in FIG. 6, the K component is generated especially when an object to be rendered is only a character.

Banding Print Process

The banding print process in step S303 will be explained in detail below.

If the CPU 2 determines that the banding print process is possible, the DMA controller 5 reads out the required display list from the RAM 4 and writes the display list in the R, G, and B renderers 7, 8, and 9 via the bus 27 in consideration of the states of the band memories 107 and 108.

For example, in the R renderer 7, the input display list is temporarily stored in the FIFO 100, and respective parameters included in that display list are set in the shape generator 101, color register 102, rendering logic register 103, and coefficient register 104. After the parameters are set, the BPU 105 selects one of the band memories 107 and 108, which is used to generate rendering data, and loads bitmap data at the rendering position, which is to undergo an arithmetic operation with write data, via the selector 106. Assume that the band memory 107 is selected.

The BPU 105 generates rendering data by making an arithmetic operation of bitmap data at the rendering position loaded from the selected band memory 107 with write data using the parameters designated by the shape generator 101, color register 102, rendering logic register 103, and coefficient register 104, and writes it at the rendering position of the band memory 107.

For example, when the transparency 206 is "0.4", color data 203 is "R=0E0(h)", and rendering logic 202 is "overwrite" in one element of a display list that indicates given write data, and when bitmap data at the corresponding rendering position is "R=010(h)" ((h) indicates hexadecimal notation), the BPU 105 makes an arithmetic operation given by:

$$0E0(h) \times 0.4 + 010(h) \times (1-0.4)$$

In this case, "63" is written at the rendering position of the band memory.

At this time, since the band memory which is not used to generate rendering data (the band memory 108 in this case) stores rendering data which is already complete in the previous (immediately preceding) band, the video shipper 110 sequentially reads out the rendering data from the head of the band memory 108 via the selector 109 and outputs it as rendering data to be printed from the R renderer 7.

When rendering data output from the rendering data have the RGB format, the RGB rendering data are converted into data in a color space used in the print process in the engine 28, i.e., into four planes, i.e., Y, M, C, and K planes by, e.g., masking processes of the color space converter 11. Note that the individual planes are simultaneously converted.

When the engine 28 forms Y, M, C, and K plane images on a recording medium, predetermined time differences are produced in units of planes due to the physical arrangements (positions) of the individual image forming units. Hence, the image forming timings in units of planes are adjusted by delaying three out of four colors (i.e., except for one color K that undergoes image formation last) via the delay circuits 12 to 14. For example, when the developers 19 to 22 for the respective colors are placed at equal intervals, and time T is required for conveying the recording medium between neighboring developers, a delay circuit for delaying time T between the first and second image planes, a delay circuit for delaying 2T (T×2) until the third image plane, and a delay circuit for delaying 3T until the last image plane are required. Hence, the delay circuits 12 to 14 respectively delay T, 2T, and 3T, and comprise means (buffers) for holding image data rendered during time periods T, 2T, and 3T.

Control Based on Input Data Format

This embodiment is characterized by making the following control based on the input image data format.

When image data in the RGB format is transferred from the host computer 1, the renderers 7 to 9 respectively render R, G, and B images, the rendered R, G, and B image data are converted into the YMCK format by the color space converter 11, and the banding print process is then made. In this case, the K renderer 10 is not used. Note that the renderers 7 to 9 load the display list at the same timings, and required data are stored in their registers (band memories).

On the other hand, when image data in the YMCK format is transferred from the host computer 1, the renderers 7 to 9 respectively render Y, M, and C images, and the renderer 10 renders a K image. The YMCK outputs from the renderers 7 to 10 are directly input to the selectors 15 to 18 since they need not undergo any conversion in the color space converter 11. Hence, since the outputs from the renderers are not delayed, the timings at which the display list is loaded to generate images in the respective renderers must be shifted by T.

As described above, the delay circuits 12 to 14 comprise buffers (memories) for holding image data rendered during time periods T, 2T, and 3T. Hence, when a high-quality print process (e.g., an increase in number of gray levels, resolution, or the like) is to be made, the delay circuits 12 to 14 must have a larger buffer size, resulting in high cost.

According to this embodiment, when a print process is made at the normal number of gray levels or resolution, RGB rendering is made; when a high-quality print process with a larger data size is to be made, YMCK rendering is made to obviate the need for increasing the buffer size of the delay circuits 12 to 14. That is, the delay circuits 12 to 14 need only have a buffer size large enough to make a print process at the normal number of gray levels or resolution. When a high-quality print process is made, YMCK rendering that requires no delay circuit is done. In this case, since no color space conversion is required, optimal cost performance can be obtained in the image processing apparatus.

Hence, even when the print process is impossible due to too small a buffer size of the delay circuits in the RGB format, it may be possible in the YMCK format.

Note that the format of image data to be transferred can be controlled by the host computer 1. When a high-quality print process is to be made or when it is informed that a banding print process is impossible in the RGB format, image data can be transferred to the image processing apparatus in the YMCK format. When the host computer 1 instructs the image processing apparatus to start the print process, the printer driver of the host computer 1 may check based on the data size to be print-processed if a banding print process is possible, and may determine if image data is to be transferred in the RGB format.

As described above, according to the image processing apparatus of this embodiment, even when image data input from the host computer has either the RGB or YMCK format, rendering data can be appropriately generated and printed out.

Even when a banding print process in the RGB format is impossible, a banding print process in the YMCK format is possible, and a high-quality image can be printed using a smaller memory size.

Since image data in the YMCK format is input and printed out, a high-quality print process is achieved without increasing the memory size in the apparatus.

Second Embodiment

The second embodiment according to the present invention will be described in detail below.

Figure 7:
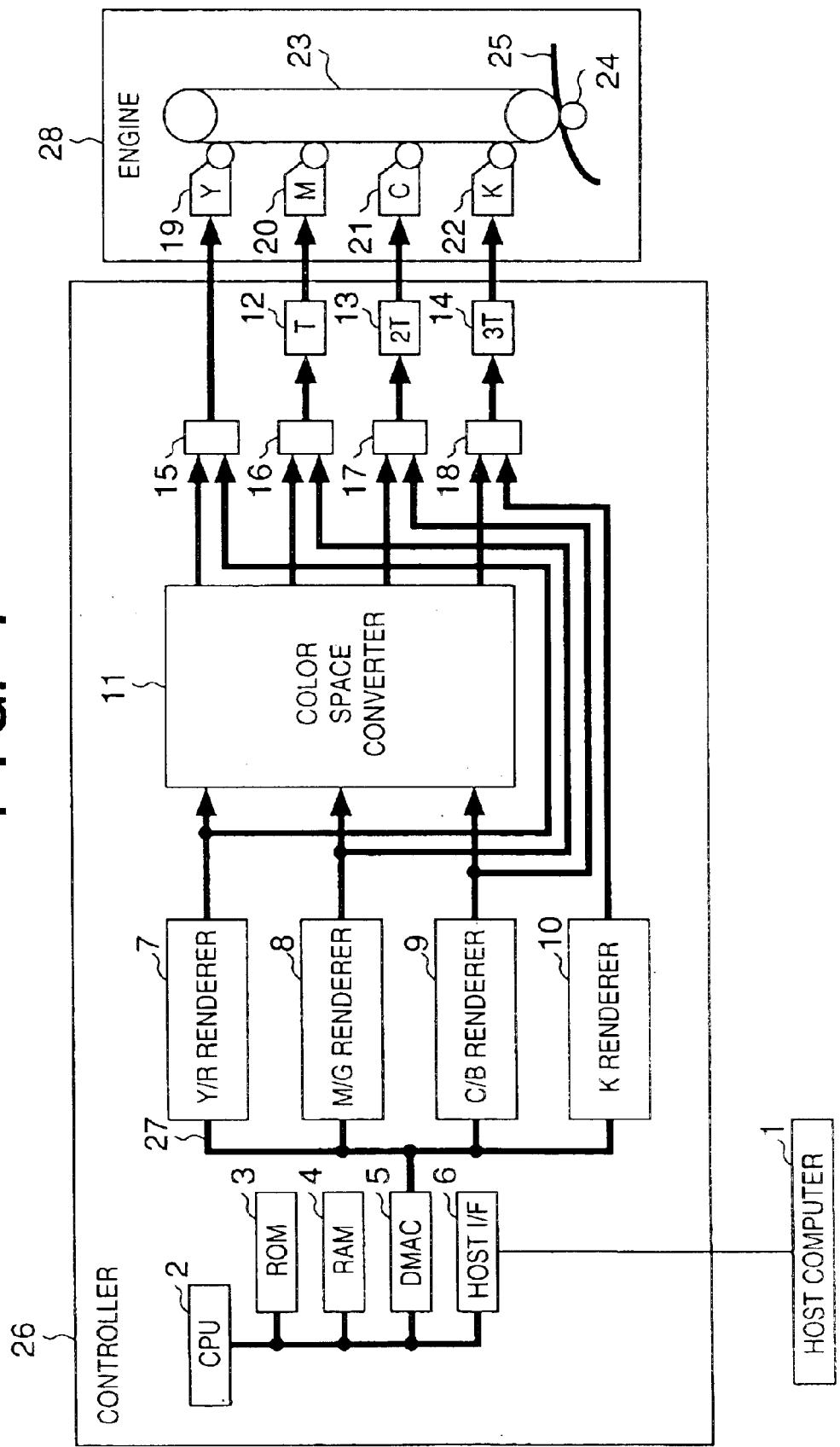
FIG. 7 is a block diagram showing the arrangement of an image processing apparatus according to the second embodiment of the present invention.

FIG. 7 is a block diagram showing the arrangement of the image processing apparatus according to the second embodiment. The same reference numerals in the second embodiment denote the same parts as in the arrangement shown in FIG. 1 of the first embodiment, and a detailed description thereof will be omitted. The arrangement shown in FIG. 7 is characterized in that the delay circuits 12 to 14 shown in FIG. 1 are inserted after the selectors 16 to 18.

Hence, in the second embodiment, even when image data in the YMCK format is input, the renderers need not shift the timings at which the display list is read to generate images by T. That is, Y, M, C, and K planes can be simultaneously rendered as in RGB rendering in the first embodiment. In this embodiment, the renderers 7 to 10 of the respective colors simultaneously load shape data to reduce the load on the bus 27.

Figure 8A:
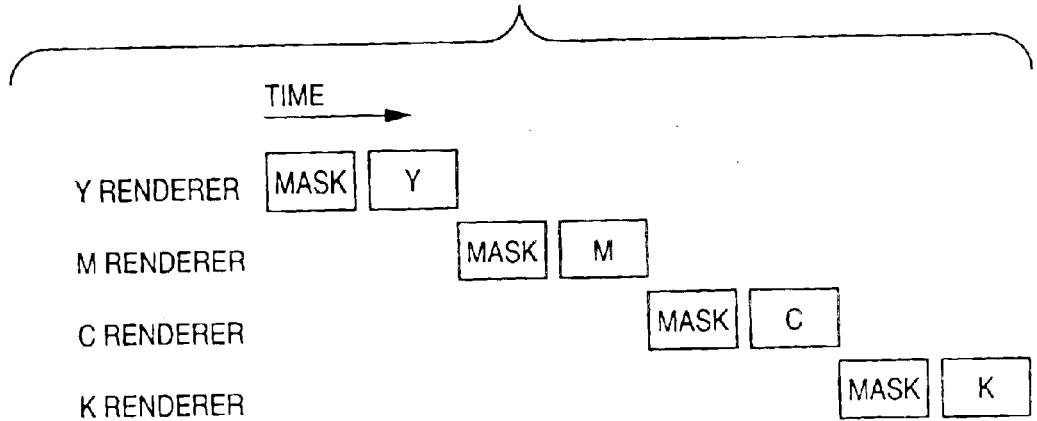
FIGS. 8A and 8B show pass sequences in the second embodiment.
Figure 8B:
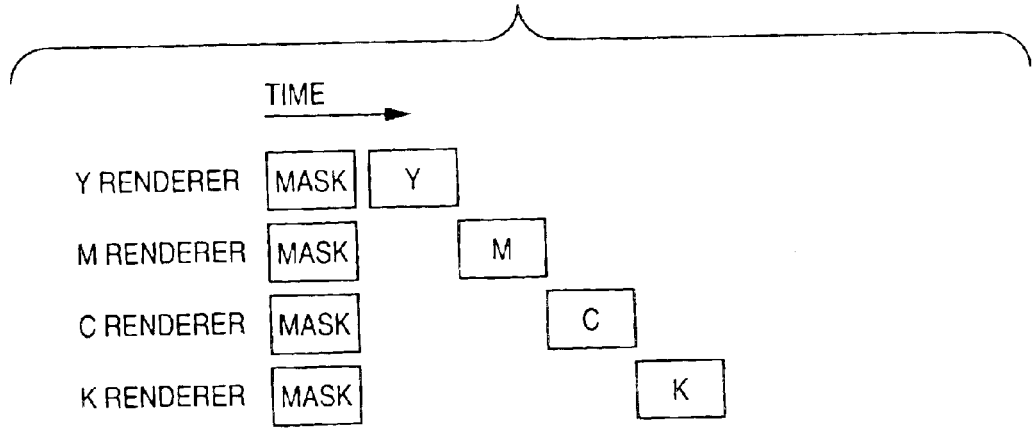

FIGS. 8A and 8B show the load states of the bus 27. FIG. 8A shows a case wherein different bands are rendered by shifting rendering timings in units of Y, M, C, and K planes, and FIG. 8B shows a case wherein identical bands are rendered in the individual planes. According to FIG. 8B, when the renderers 7 to 10 simultaneously load shape data (MASK), the load on the bus 27 can be reduced compared to a case wherein different bands are rendered shown in FIG. 8A, thus improving rendering performance.

As described above, according to the second embodiment, even when image data in the YMCK format is input, each renderer need not perform any delay control. Therefore, since Y, X, C, and K planes can be rendered at the same time, the load on the bus 27 can be reduced.

[Other Embodiments]

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, appropriate image formation and print processes can be achieved irrespective of the format of input image data.

Also, a high-quality print process can be achieved without increasing the memory size in the apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   rendering means for rendering data in a first color space and data in a second color space; and
   a plurality of image forming means for forming images in units of colors of the rendered image data,
   wherein said rendering means performs band mapping of data if band mapping is possible, and
   wherein, when band mapping is impossible in said rendering means, said apparatus informs a host computer to which said apparatus is connected that the band mapping is impossible.

2. The apparatus according to claim 1, wherein the first and second color spaces are respectively RGB and YMCK spaces.

3. The apparatus according to claim 1, wherein the plurality of image forming means form Y, M, C, and K images.

4. The apparatus according to claim 1, further comprising conversion means for converting the data in the first color space into data in the second color space,
   wherein said image forming means forms an image based on one of data rendered in the second color space by said rendering means and data converted by said conversion means.

5. The apparatus according to claim 1, wherein when the band mapping is impossible in said rendering means, said apparatus processes data to have a format with which the band mapping is possible.

6. The apparatus according to claim 1, wherein said rendering means simultaneously renders a plurality of color data upon rendering data in the first color space, and renders a plurality of color data in turn upon rendering image data in the second color space.

7. The apparatus according to claim 1, wherein image formation using data in the second color space assures higher quality than image formation using data in the first color space.

8. An image processing method comprising the steps of:
   rendering data in a first color space and data in a second color space; and
   forming images of the rendered image data in units of colors,
   wherein said rendering step includes performing band mapping of data if band mapping is possible, and
   wherein, when band mapping is impossible in said rendering step, notification is sent to a host computer to which an apparatus performing said method is connected, the notification stating that the band mapping is impossible.

9. A storage medium storing a program which comprising:
   a code of a step of rendering data in a first color space and data in a second color space; and
   a code of a step of forming images of the rendered image data in units of colors,
   wherein said rendering step includes performing band mapping of data if band mapping is possible, and
   wherein, when band mapping is impossible in said rendering step, notification is sent to a host computer to which an apparatus performing said method is connected, the notification stating that the band mapping is impossible.

10. An image processing apparatus capable of forming an image based on image data in RGB or YMCK format transmitted from an information processing apparatus, said image processing apparatus comprising:
   holding means for holding the image data transmitted;
   rendering means for acquiring the image data held in said holding means in units of colors by accessing said holding means via a bus, and generating rendering data;
   image forming means for forming an image in units of colors based on the rendering data; and
   determining means for, when a format of the image data is RGB format, predicting the rendering time for generating the rendering data in the RGB format based on the load of bus for acquiring the image data in the RGB format in units of colors, and determining whether or not it is possible to generate the rendering data, wherein, if it is determined by said determining means that it is not possible to generate the rendering data, an image in YMCK format is formed by demanding that the information processing apparatus transmits image data in YMCK format.

11. The apparatus according to claim 10, further comprising converting means for converting the rendering data in RGB format into a rendering data in YMCK format, wherein said image forming means forms an image, in units of colors, based on the rendering data in YMCK format generated by said rendering means or the rendering data in YMCK format converted by said converting means.

12. image processing apparatus comprising:

first rendering means for rendering data in a first color space and generating a plurality of images;

second rendering means for rendering data in a second color space and generating a plurality of images;

conversion means for converting the plurality of images generated by said first rendering means into a plurality of images in the second color space; and a plurality of image forming means for forming the plurality of images converted by said conversion means or the plurality of images generated by said second rendering means, wherein each of said plurality of image forming means forms an image by a predetermined time difference according to the physical position of each of said plurality of image forming means.

13. The apparatus according to claim 12, wherein the data in the first and second color spaces are transmitted from a host computer.

14. The apparatus according to claim 12, wherein said first and second rendering means render the data in the first color space or the data in the second color space which is mapped into a display list.

15. An image processing method comprising:

a first rendering step, of rendering data in a first color space and generating a plurality of images;

a second rendering step, of rendering data in a second color space and generating a plurality of images;

a conversion step, of converting the plurality of images generated in said first rendering step into a plurality of images in the second color space; and a plurality of image forming steps, of forming the plurality of images converted in said conversion step or the plurality of images generated in said second rendering step, wherein each of said plurality of image forming steps includes forming an image by a predetermined time difference according to the physical position of each of a plurality of image forming means for forming the plurality of images converted in said conversion step or the plurality of images generated in said second rendering step.

* * * * *

UNITED STATES PATENT AND TRADEMARK OFFICE
CERTIFICATE OF CORRECTION

PATENT NO. : 6,891,638 B1
DATED : May 10, 2005
INVENTOR(S) : Tomoo Iizumi et al.

It is certified that error appears in the above-identified patent and that said Letters Patent is hereby corrected as shown below:

Column 2,
Line 63, "numeral 15" should read -- numerals 15 --.

Column 10,
Line 43, "comprising:" should read -- comprises: --.

Column 11,
Line 18, "image" should read -- An image --.

Signed and Sealed this

Twenty-first Day of March, 2006

JON W. DUDAS
*Director of the United States Patent and Trademark Office*